United States Patent
Onoda et al.

(10) Patent No.: US 10,689,035 B2
(45) Date of Patent: Jun. 23, 2020

(54) SIDE RAIL AND MANUFACTURING METHOD OF SIDE RAIL

(71) Applicant: TOYOTA JIDOSHA KABUSHIKI KAISHA, Toyota-shi, Aichi-ken (JP)

(72) Inventors: Masahiro Onoda, Toyota (JP); Makoto Kato, Nissin (JP); Takaaki Onodera, Toyota (JP); Junichi Amo, Aichi-ken (JP); Tokukatsu Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 84 days.

(21) Appl. No.: 16/157,724

(22) Filed: Oct. 11, 2018

(65) Prior Publication Data

US 2019/0111973 A1    Apr. 18, 2019

(30) Foreign Application Priority Data

Oct. 16, 2017 (JP) ................. 2017-200341

(51) Int. Cl.
| | | |
|---|---|---|
| *B62D 21/12* | (2006.01) | |
| *B62D 21/15* | (2006.01) | |
| *B62D 21/02* | (2006.01) | |
| *B23K 26/323* | (2014.01) | |
| *B23K 26/24* | (2014.01) | |
| *B23K 101/00* | (2006.01) | |

(52) U.S. Cl.
CPC ............ *B62D 21/152* (2013.01); *B23K 26/24* (2013.01); *B23K 26/323* (2015.10); *B62D 21/02* (2013.01); *B62D 21/15* (2013.01); *B23K 2101/006* (2018.08)

(58) Field of Classification Search
CPC ...... B62D 21/152; B62D 21/02; B62D 21/15; B32K 26/323; B32K 26/24; B32K 2101/006
See application file for complete search history.

(56) References Cited

U.S. PATENT DOCUMENTS

| | | | |
|---|---|---|---|
| 2010/0045072 A1 | 2/2010 | Yamada et al. | |
| 2011/0298245 A1 | 12/2011 | Jarocki et al. | |
| 2016/0052552 A1* | 2/2016 | Yamamoto | B62D 25/025 296/187.1 |
| 2017/0088184 A1* | 3/2017 | Emura | B62D 21/157 |
| 2018/0029645 A1 | 2/2018 | Von Watzdorf et al. | |
| 2018/0126435 A1 | 5/2018 | Egawa et al. | |

FOREIGN PATENT DOCUMENTS

| | | |
|---|---|---|
| DE | 10 2016 114 068 B3 | 8/2017 |
| JP | 2009-202619 A | 9/2009 |
| JP | 2018-075612 A | 5/2018 |

* cited by examiner

*Primary Examiner* — Lori L Lyjak
(74) *Attorney, Agent, or Firm* — Sughrue Mion, PLLC

(57) ABSTRACT

A side rail includes base members, and plate members that are different in both plate thickness and material from the base members. The base members have a cutout or an opening, and the plate members are fitted into this cutout or opening and joined to the base members by laser welding.

4 Claims, 8 Drawing Sheets

SIDE RAIL AND MANUFACTURING METHOD OF SIDE RAIL

INCORPORATION BY REFERENCE

The disclosure of Japanese Patent Application No. 2017-200341 filed on Oct. 16, 2017 including the specification, drawings and abstract is incorporated herein by reference in its entirety.

BACKGROUND

1. Technical Field

The present disclosure relates to a side rail that extends along a vehicle body length direction and has a closed-section structure, and to a manufacturing method of this side rail.

2. Description of Related Art

A conventional vehicle body frame of a truck, bus, etc. includes a pair of left and right side rails (also called side frames) extending along a vehicle body length direction, and a cross member suspended across these side rails.

A reinforcing member is joined to the side rails of this type of vehicle body frame, with the load absorption performance in a frontal collision of the vehicle, the vehicle body strength, etc. taken into consideration. For example, Japanese Patent Application Publication No. 2009-202619 (JP 2009-202619 A) discloses a structure in which a reinforcing member (referred to as a stiffener in JP 2009-202619 A) is welded to an inner surface of a side rail (referred to as a side frame in JP 2009-202619 A).

FIG. 12 shows a cross-section structure of a common side rail a in the related art (a cross-section structure of an upper part of the side rail a). As shown in FIG. 12, the side rail a has a closed-section structure formed by an inner rail member b (also called an inner channel) located on the inner side in a vehicle width direction and an outer rail member c (also called an outer channel) located on the outer side in the vehicle width direction that are joined together by arc welding. For example, a reinforcing member d is joined by arc welding to a corner of an inner surface of the outer rail member c at a portion in a longitudinal direction (a direction orthogonal to the sheet plane of FIG. 12). Specifically, the reinforcing member d is placed along the inner surface of each of a horizontal part and a vertical part of the outer rail member c, and outer edges of the reinforcing member d are joined to the inner surface of the outer rail member c by arc welding. This structure can enhance the vehicle body strength at the portion of the side rail a in the longitudinal direction at which the reinforcing member d is joined, and in the event of a frontal collision of the vehicle, can achieve load absorption performance based on deformation of a pre-specified portion as the collision load is absorbed by deformation of a portion of the side rail a in the longitudinal direction at which the reinforcing member d is not joined.

SUMMARY

Since only the outer edges of the reinforcing member d are joined to the inner surface of the outer rail member c, a clearance exists between the other part of the reinforcing member d and the outer rail member c in the structure of the side rail a described above. This makes it difficult to produce a sufficient effect in securing the vehicle body strength etc.

It is conceivable to take a measure such as increasing the plate thickness of the reinforcing member d (e.g., making the plate thickness of the reinforcing member d larger than that of the inner rail member b and the outer rail member c), which, however, results in an undesirable significant increase in weight of the vehicle body.

The present disclosure provides a side rail that can achieve required load absorption performance and vehicle body strength without causing a significant increase in weight of the vehicle body, and a manufacturing method of this side rail.

A first aspect of the present disclosure relates to a side rail that extends along a vehicle body length direction and has a closed-section structure. This side rail includes base members forming a main part of the side rail, and plate members that are different in plate thickness and material from the base members. The plate members are fitted in a cutout or an opening formed at a portion of the base members. The plate members have a laser-welded joint that is a joint portion at which the plate members are joined to the base members by laser welding.

According to this specification item, it is possible to realize a side rail that can achieve required load absorption performance and vehicle body strength, without joining a reinforcing member to an inner surface of the side rail by arc welding, by appropriately selecting the plate thickness and the material of the plate members that are fitted into the cutout or the opening formed at a portion of the base members and joined to the base members by laser welding. This means that the required load absorption performance and vehicle body strength can be achieved without causing a significant increase in weight of the vehicle body. Even in a case where a reinforcing member is joined to an inner surface of the side rail by arc welding, it is possible to achieve the required load absorption performance and vehicle body strength while adopting a member having a small mass as the reinforcing member. Thus, also in this case, a significant increase in weight of the vehicle body can be avoided.

The plate members may be made of a material having tensile strength lower than the tensile strength of the base members, and the plate members may deform under a collision load in a frontal collision of a vehicle.

Thus, in the event of a frontal collision of the vehicle, the load can be absorbed by deformation of regions of the side rail at which the plate members are used, so that high load absorption performance is delivered.

The side rail may include an inner rail member forming an inner part in a vehicle width direction and an outer rail member forming an outer part in the vehicle width direction. The inner rail member and the outer rail member may be integrally welded together to form the closed-section structure. The side rail may further include a curved part shaped so as to curve toward the outer side in the vehicle width direction as the curved part extends toward a vehicle body rear side. The outer rail member at a front end portion of the curved part and the inner rail member at a rear end portion of the curved part may be respectively formed by fitting the plate members made of a material having tensile strength lower than the tensile strength of the base members into the cutout or the opening formed at a portion of the base members, and joining the plate members to the base members by laser welding.

Thus, when a collision load acts on the curved part in a frontal collision of the vehicle, the front end portion of the curved part and the rear end portion of the curved part bend (undergo buckling deformation) in opposite directions from each other. Specifically, the front end portion of the curved part deforms in a direction in which the outer rail member is compressed, while the rear end portion of the curved part deforms in a direction in which the inner rail member is compressed, and thereby effective load absorption performance is delivered.

A second aspect of the present disclosure relates to a manufacturing method of a side rail. The second aspect of the present disclosure includes: forming a cutout or an opening at a portion of base members forming a main part of the side rail; fitting plate members that are different in both plate thickness and material from the base members into the cutout or the opening; joining the plate members having been fitted into the cutout or the opening to the base members by laser welding; bending the base members to which the plate members have been joined, along with the plate members; and integrally joining together a first rail member and a second rail member that are formed by the bent base members and plate members such that a closed-section structure is formed by the first rail member and the second rail member.

Thus, a manufacturing method of a side rail that can achieve required load absorption performance and vehicle body strength without causing a significant increase in weight of the vehicle body can be provided.

In the present disclosure, the side rail of a vehicle body has the laser-welded joint that is a joint portion at which the base member and the plate member that is different in both plate thickness and material from the base member and fitted in the cutout or the opening formed at a portion of the base member are joined together by laser welding. Thus, it is possible to achieve required load absorption performance and vehicle body strength without causing a significant increase in weight of the vehicle body.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure will be described below based on the drawings. In this embodiment, a case where the present disclosure is applied to a side rail of a vehicle body frame configured as a so-called ladder frame will be described.

General Structure of Vehicle Body Frame

Figure 1:
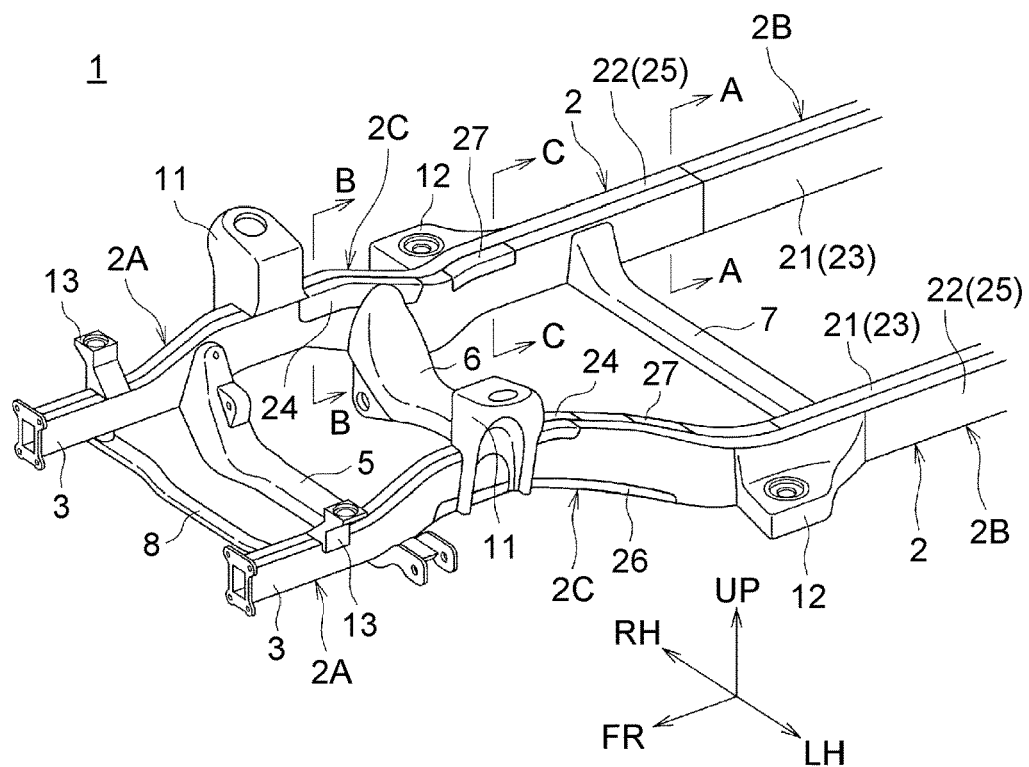
FIG. 1 is a perspective view showing a front-side part of a vehicle body frame according to an embodiment.
Figure 2:
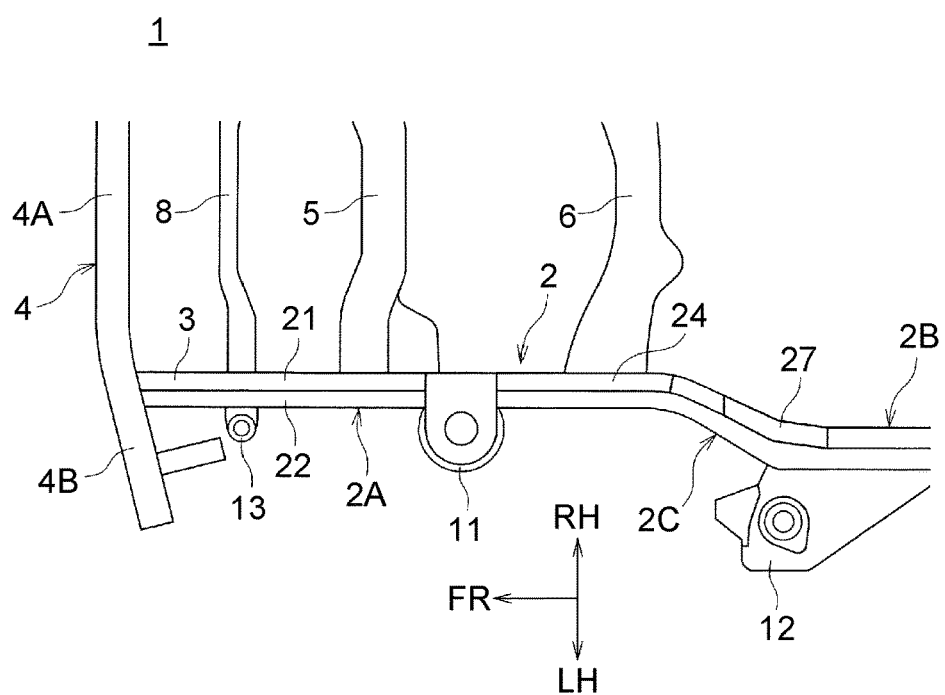
FIG. 2 is a plan view showing a portion of the front-side part of the vehicle body frame according to the embodiment.
Figure 3:
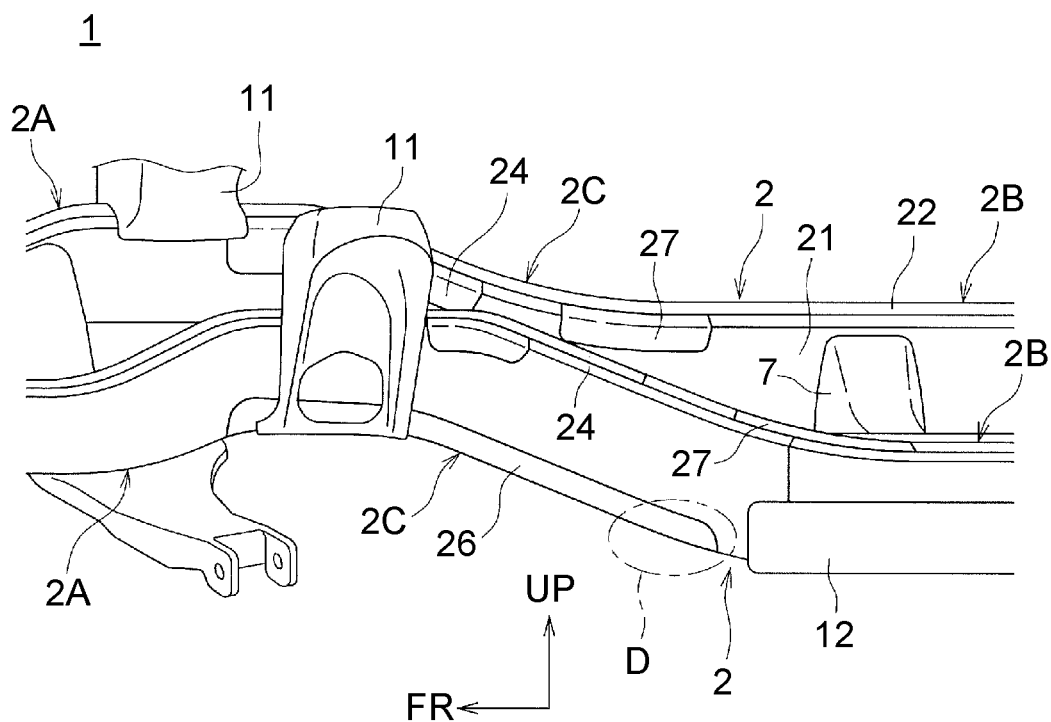
FIG. 3 is a view, as seen from a lateral side, of main portions of the front-side part of the vehicle body frame according to the embodiment.

FIG. 1 is a perspective view showing a front-side part of a vehicle body frame 1 according to the embodiment. FIG. 2 is a plan view showing a portion (left half) of the front-side part of the vehicle body frame 1 according to the embodiment. FIG. 3 is a view, as seen from a lateral side (a left side of a vehicle body), of main portions of the front-side part of the vehicle body frame 1 according to the embodiment. The arrows FR, UP, RH, and LH in the drawings respectively indicate a frontward direction, upward direction, rightward direction, and leftward direction.

As shown in FIG. 1 to FIG. 3, the vehicle body frame 1 includes a pair of left and right side rails 2 that extends along a vehicle body length direction on outer sides in a vehicle width direction. A front wheel (not shown) is installed on the outer side of a front part 2A of each side rail 2 in the vehicle width direction. Therefore, with interference with these front wheels taken into account, the dimension of the side rails 2 in the vehicle width direction at the front parts 2A (the dimension between the left and right side rails 2) is set to be smaller than the dimension in the vehicle width direction at intermediate parts 2B located at the middle of the side rails 2 in the vehicle body length direction.

A kick part (curved part) 2C shaped so as to curve toward the outer side in the vehicle width direction as the kick part 2C extends from a vehicle body front side toward a vehicle body rear side of the side rail 2 is provided between the front part 2A and the intermediate part 2B of the side rail 2. Thus, the front part 2A and the intermediate part 2B of the side rail 2 are continuous with each other through the kick part 2C. The installation level of the front part 2A of the side rail 2 is set to be higher than the installation level of the intermediate part 2B, with arrangement of a suspension unit etc. (not shown) taken into account. Accordingly, the kick part 2C is inclined downward as the kick part 2C extends from the side of the front part 2A of the side rail 2 toward the vehicle body rear side (see FIG. 3).

A crash box 3 that absorbs energy (collision load) in a frontal collision of the vehicle is provided on a front side of the front part 2A of each of the pair of left and right side rails 2. A bumper reinforcement 4 extending along the vehicle width direction is suspended across front end portions of the pair of left and right crash boxes 3 (see FIG. 2). Alternatively, the bumper reinforcement 4 may be directly suspended across front end portions of the side rails 2, without the crash boxes 3 provided between the front end portions of the side rails 2 and the bumper reinforcement 4. The bumper reinforcement 4 is shaped such that both end parts 4B in the vehicle width direction curve toward the vehicle body rear side relative to an intermediate part 4A in the vehicle width direction.

Farther on the vehicle body rear side than the bumper reinforcement 4, a plurality of cross members 5, 6, 7 extends along the vehicle width direction between the side rails 2. Specifically, the cross members 5, 6, 7 are suspended in the vehicle width direction across the pair of left and right side rails 2 in this order from the vehicle body front side. Thus, the vehicle body frame 1 of this embodiment is configured as a ladder frame. The cross member 5 is suspended across the front parts 2A of the side rails 2, and the cross member 6 is suspended across the front end portions of the kick parts 2C of the side rails 2. The cross member 7 is suspended across the intermediate parts 2B of the side rails 2. A front-side coupling part 8 is suspended across the side rails 2, farther on the vehicle body front side than the cross member 5.

A suspension mount bracket 11 made of metal and protruding toward the outer side of the side rail 2 in the vehicle width direction is installed at the front part 2A of each side rail 2, between the cross member 5 and the cross member 6. A suspension mount (not shown) is mounted on the suspension mount bracket 11, and the suspension unit can be coupled to the side rails 2 through the suspension mounts and the suspension mount brackets 11.

A cab mount bracket 12 is installed at a rear end portion of the kick part 2C of each side rail 2. The cab mount bracket 12 protrudes toward the outer side in the vehicle width direction, and a cab mount (not shown) is mounted on the cab mount bracket 12. A cab (body; not shown) can be coupled to the side rails 2 through the cab mounts and the cab mount brackets 12. A cab mount bracket 13 protruding from the side rail 2 toward the outer side in the vehicle width direction is installed at the front end portion of the front part 2A of each side rail 2. The cab (body; not shown) can be coupled to the side rails 2 by the cab mount brackets 13.

Structure of Side Rail

Next, the structure of the side rails 2 that is the feature of this embodiment will be described. Since the side rails 2 have the same structure (the structures are symmetrical in the left-right direction), the structure of the side rail 2 located on the right side in the vehicle width direction will be described here as an example.

Figure 4A:
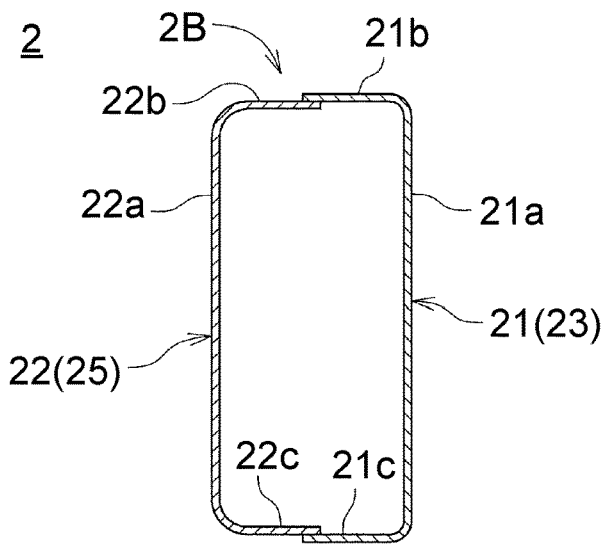
FIG. 4A is a sectional view taken along line A-A in FIG. 1.
Figure 4B:
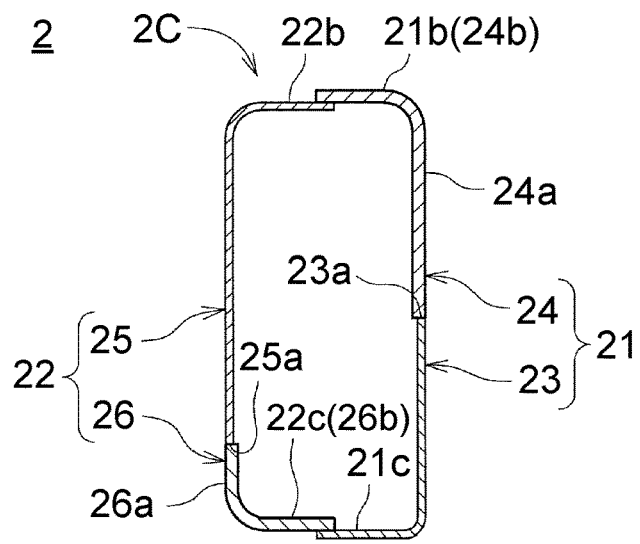
FIG. 4B is a sectional view taken along line B-B in FIG. 1.
Figure 4C:
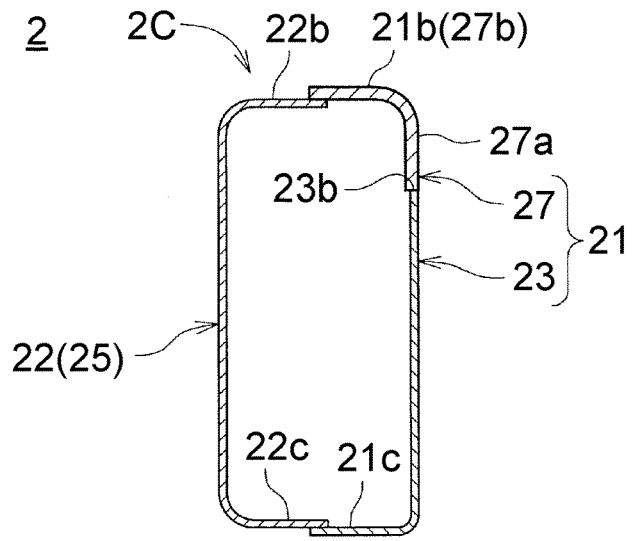
FIG. 4C is a sectional view taken along line C-C in FIG. 1.

FIG. 4A is a sectional view of the side rail 2 taken along line A-A in FIG. 1. FIG. 4B is a sectional view of the side rail 2 taken along line B-B in FIG. 1. FIG. 4C is a sectional view of the side rail 2 taken along line C-C in FIG. 1. Specifically, FIG. 4A is a sectional view of the intermediate part 2B, and at the intermediate part 2B, the side rail 2 is composed of only two base members 23, 25. FIG. 4B is a sectional view of the front end portion of the kick part 2C, and at the front end portion of the kick part 2C, the side rail 2 is composed of the two base members 23, 25 forming a main part of the side rail 2 and two plate members 24, 26 (plate members with a different thickness). FIG. 4C is a sectional view of the rear end portion of the kick part 2C, and at the rear end portion of the kick part 2C, the side rail 2 is composed of the two base members 23, 25 and one plate member 27. Each of the base members 23, 25 and the plate members 24, 26, 27 is formed by a hot-rolled steel plate. In the following, each part will be specifically described.

Structure of Intermediate Part

The intermediate part 2B shown in the sectional view of FIG. 4A is a part having a basic structure of the side rail 2, and has a closed-section structure formed by an inner rail member (inner channel) 21 forming an inner part in the vehicle width direction and an outer rail member (outer channel) 22 forming an outer part in the vehicle width direction that are integrally joined together by arc welding. At the intermediate part 2B, the inner rail member 21 and the outer rail member 22 are respectively formed by only the base members 23, 25. The base members 23, 25 have the same plate thickness and are made of the same material. For example, a member having a plate thickness of about 3.0 mm and tensile strength of about 600 MPa is adopted. However, the plate thickness and the tensile strength are not limited to these values, and a member that can secure sufficient strength (vehicle body strength) as the side rail 2 is adopted.

The inner rail member 21 (base member 23) has a sectional shape formed by a vertical part 21a, an upper horizontal part 21b extending from an upper end of the vertical part 21a toward the outer side in the vehicle width direction so as to have a predetermined dimension, and a lower horizontal part 21c extending from a lower end of the vertical part 21a toward the outer side in the vehicle width direction so as to have a predetermined dimension. The outer rail member 22 (base member 25) has a sectional shape formed by a vertical part 22a, an upper horizontal part 22b extending from an upper end of the vertical part 22a toward the inner side in the vehicle width direction so as to have a predetermined dimension, and a lower horizontal part 22c extending from a lower end of the vertical part 22a toward the inner side in the vehicle width direction so as to have a predetermined dimension. A lower surface of the upper horizontal part 21b of the inner rail member 21 is laid on an upper surface of the upper horizontal part 22b of the outer rail member 22, and these surfaces are joined together by arc welding. Similarly, an upper surface of the lower horizontal part 21c of the inner rail member 21 is laid on a lower surface of the lower horizontal part 22c of the outer rail member 22, and these surfaces are joined together by arc welding. Thus, the side rail 2 has a substantially rectangular closed-section structure. This closed-section structure (the basic structure of the side rail 2) formed by arc-welding the inner rail member 21 and the outer rail member 22 that are formed respectively by only the base members 23, 25, is adopted not only at the intermediate part 2B but also in substantially the entire side rail 2 except for the front end portion of the kick part 2C (the portion shown in the section of FIG. 4B) and the rear end portion of the kick part 2C (the portion shown in the section of FIG. 4C).

This embodiment features the front end portion of the kick part 2C (the portion shown in the section of FIG. 4B) and the rear end portion of the kick part 2C (the portion shown in the section of FIG. 4C).

Structure of Front End Portion of Kick Part

Figure 5A:
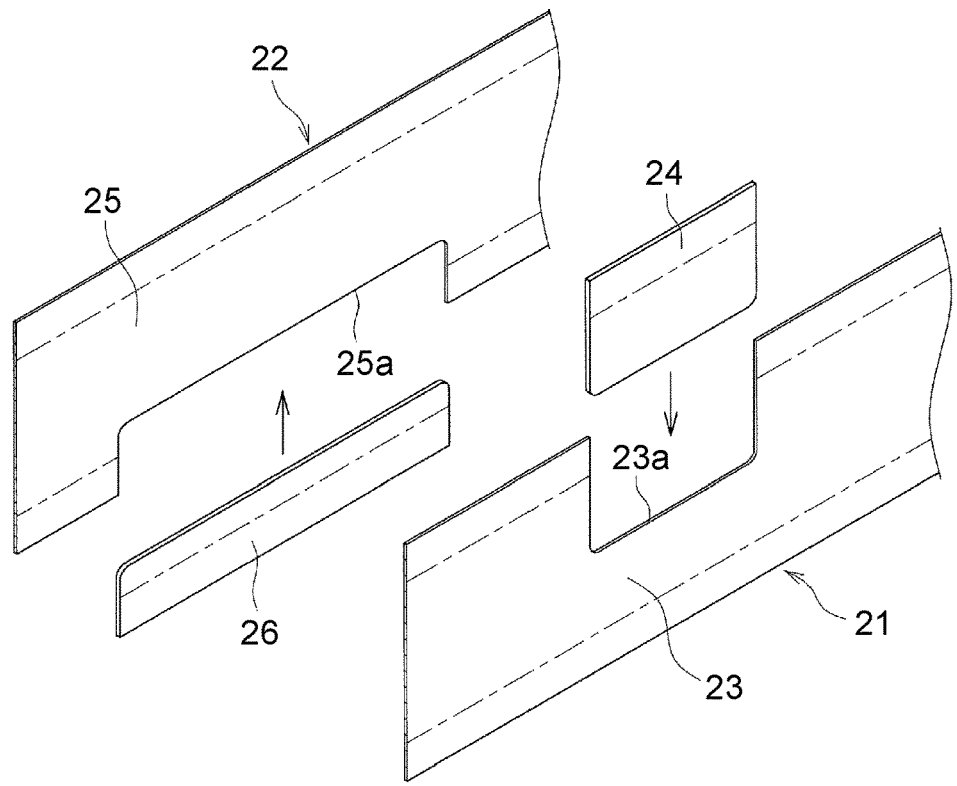
FIG. 5A is a view illustrating a manufacturing process of a side rail according to the embodiment.
Figure 5B:
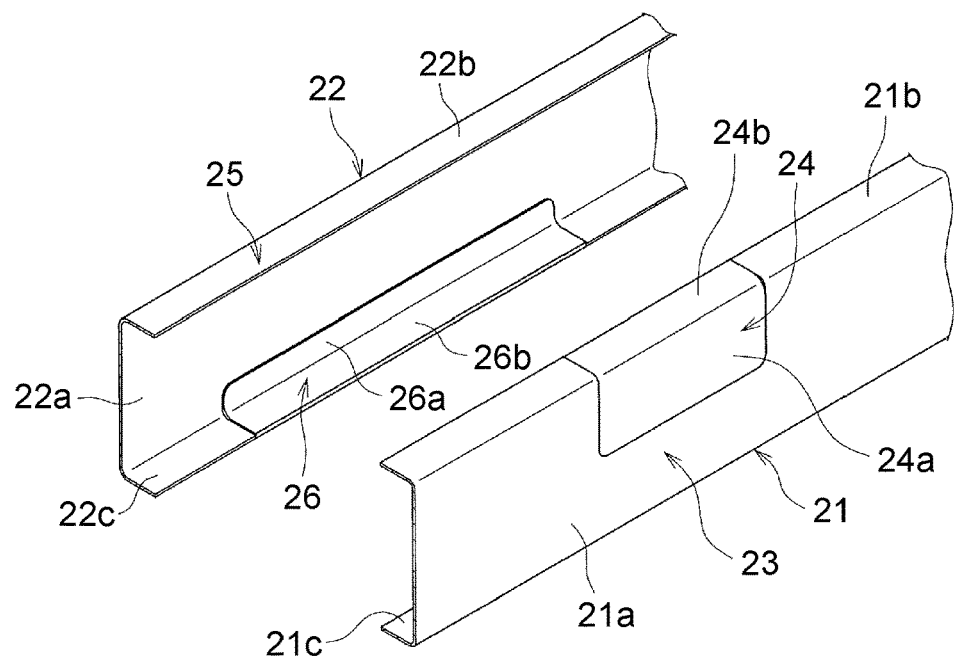
FIG. 5B is a view illustrating the manufacturing process of the side rail according to the embodiment.

The structure of the front end portion of the kick part 2C will be described using FIG. 4B. FIG. 5A and FIG. 5B are views illustrating a manufacturing process of the side rail 2 and show the front end portion of the kick part 2C.

As shown in FIG. 4B, the front end portion of the kick part 2C has a closed-section structure formed by four panel members 23, 24, 25, 26 that are integrally joined together. Specifically, the base member 23 of the inner rail member 21, the first plate member 24 thereof that is fitted in a cutout 23a (see FIG. 5A) formed in the base member 23 and joined to the base member 23 by laser welding, the base member 25 of the outer rail member 22, and the second plate member 26 thereof that is fitted in a cutout 25a formed in the base member 25 and joined to the base member 25 by laser welding, are integrally joined together to form the front end portion of the kick part 2C.

Specifically, as shown in FIG. 5A, in the manufacturing process of the side rail 2, a portion (upper edge) of the base member 23 of the inner rail member 21 having a flat plate shape is cut out to form the cutout 23a (a step of forming a cutout at a portion of the base member), and the first plate member 24 having a shape substantially matching the shape of the cutout 23a is fitted into the cutout 23a (fitted so as to butt end edges; a step of fitting the plate member into the cutout). Then, butted inner edges of the cutout 23a and outer edges of the first plate member 24 are joined together by laser welding (a step of joining the plate member having been fitted into the cutout to the base member by laser welding). This joint portion forms the "laser-welded joint." Thereafter, both end portions in a width direction (the height direction in FIG. 5A and FIG. 5B) of the inner rail member 21 having a flat plate shape are bent by press-working (portions to be bent are indicated by the long dashed short dashed lines) to form the horizontal parts 21b, 21c, and thus the inner rail member 21 is produced (see FIG. 5B; a step of bending the base member to which the plate member has been joined, along with the plate member). As the laser welding, for example, welding using a carbon dioxide laser, YAG laser, fiber laser, etc. can be used.

Similarly, as shown in FIG. 5A, a portion (lower edge) of the base member 25 of the outer rail member 22 having a flat plate shape is cut out to form the cutout 25a (a step of forming a cutout at a portion of the base member), and the second plate member 26 having a shape substantially matching the shape of the cutout 25a is fitted into the cutout 25a (fitted so as to butt end edges; a step of fitting the plate member into the cutout). Then, butted inner edges of the cutout 25a and outer edges of the second plate member 26 are joined together by laser welding (a step of joining the plate member having been fitted into the cutout to the base member by laser welding). This joint portion forms the "laser-welded joint." Thereafter, both end portions in a width direction (in the height direction in FIG. 5A and FIG. 5B) of the outer rail member 22 having a flat plate shape are bent by press-working (portions to be bent are indicated by the long dashed short dashed lines) to form the horizontal parts 22b, 22c, and thus the outer rail member 22 is produced (see FIG. 5B; a step of bending the base member to which the plate member has been joined, along with the plate member).

The upper horizontal part 21b of the inner rail member 21 produced using the base member 23 and the first plate member 24 and the upper horizontal part 22b of the outer rail member 22 produced using the base member 25 and the second plate member 26 are joined together by arc welding, and the lower horizontal part 21c of the inner rail member 21 and the lower horizontal part 22c of the outer rail member 22 are joined together by arc welding, and thereby the front end portion of the kick part 2C having a closed-section structure is formed (see FIG. 4B; a step of integrally joining together the rail members so as to form a closed-section structure).

In this embodiment, the material of the first plate member 24 is the same as the material of the base members 23, 25, and the plate thickness of the first plate member 24 is set to be larger than the plate thickness of the base members 23, 25. For example, the plate thickness of the first plate member 24 is about 4.0 mm. However, the plate thickness is not limited to this value. At the part at which outer edges of a vertical part 24a of the first plate member 24 and the inner edges of the cutout 23a of the base member 23 are butted, and at the part at which outer edges of an upper horizontal part 24b of the first plate member 24 and the inner edges of the cutout 23a of the base member 23 are butted, these edges are butted such that an outer surface of the base member 23 and an outer surface of the first plate member 24 become flush. In other words, these edges are butted such that an inner surface of the first plate member 24 protrudes toward the inner side relative to an inner surface of the base member 23 (protrudes in an amount corresponding to the difference in plate thickness therebetween).

The material of the second plate member 26 is a material having lower tensile strength than the materials of the base members 23, 25 and the first plate member 24, and the plate thickness of the second plate member 26 is set to be larger than the plate thickness of the base members 23, 25 but smaller than the plate thickness of the first plate member 24. For example, the second plate member 26 has tensile strength of about 450 MPa and a plate thickness of about 3.5 mm. However, the tensile strength and the plate thickness are not limited to these values. When the shapes of the first plate member 24 and the second plate member 26 are compared, the dimension of the second plate member 26 in the vehicle body length direction is set to be larger than the dimension of the first plate member 24 in the vehicle body length direction. The dimension of the second plate member 26 in the height direction is set to be smaller than the dimension of the first plate member 24 in the height direction.

At the part at which outer edges of a vertical part 26a of the second plate member 26 and the inner edges of the cutout 25a of the base member 25 are butted, and at the part at which outer edges of a lower horizontal part 26b of the second plate member 26 and the inner edges of the cutout 25a of the base member 25 are butted, these edges are butted such that an outer surface of the base member 25 and an outer surface of the second plate member 26 become flush. In other words, these edges are butted such that an inner surface of the second plate member 26 protrudes toward the inner side relative to an inner surface of the base member 25 (protrudes in an amount corresponding to the difference in plate thickness therebetween).

Structure of Rear End Portion of Kick Part

Next, the structure of the rear end portion of the kick part 2C will be described using FIG. 4C.

As shown in FIG. 4C, the rear end portion of the kick part 2C has a closed-section structure formed by three panel members 23, 25, 27 that are integrally joined together. Specifically, the base member 23 of the inner rail member 21, the third plate member 27 thereof that is fitted in a cutout 23b formed in the base member 23 and joined to the base member 23 by laser welding, and the base member 25 of the outer rail member 22 are integrally joined together to form the rear end portion of the kick part 2C.

Specifically, in the manufacturing process of the rear end portion of the kick part 2C, as with the case of the front end portion of the kick part 2C described above, a portion (upper edge) of the base member 23 of the inner rail member 21 having a flat plate shape is cut out to form the cutout 23b (a step of forming a cutout at a portion of the base member), and the third plate member 27 having a shape substantially matching the shape of the cutout 23b is fitted into the cutout 23b (fitted so as to butt end edges; a step of fitting the plate member into the cutout). Then, butted inner edges of the cutout 23b and outer edges of the third plate member 27 are joined together by laser welding (a step of joining the plate member having been fitted into the cutout to the base member by laser welding). This joint portion forms the "laser-welded joint." Thereafter, both end portions in the width direction of the inner rail member 21 having a flat plate shape are bent by press-working to form the horizontal parts 21b, 21c, and thus the inner rail member 21 is produced (a step of bending the base member to which the plate member has been joined, along with the plate member). The inner rail member 21 forming the rear end portion of the kick part 2C is produced at the same time as the front end portion of the kick part 2C described above.

Since no plate member is used for the outer rail member 22 forming the rear end portion of the kick part 2C, no cutout is formed in the base member 25 of the outer rail member 22 having a flat plate shape. Therefore, both end portions in the width direction of the outer rail member 22 having a flat plate shape are bent by press-working to form the horizontal parts 22b, 22c, and thus the outer rail member 22 is produced.

The upper horizontal part 21b of the inner rail member 21 produced using the base member 23 and the third plate member 27 and the upper horizontal part 22b of the outer rail member 22 produced using only the base member 25 are joined together by arc welding, and the lower horizontal part 21c of the inner rail member 21 and the lower horizontal part 22c of the outer rail member 22 are joined together by arc welding, and thereby the rear end portion of the kick part 2C having a closed-section structure is formed (see FIG. 4C; a step of integrally joining together the rail members so as to form a closed-section structure). The outer rail member 22 forming the rear end portion of the kick part 2C is produced at the same time as the outer rail member 22 forming the front end portion of the kick part 2C described above.

In this embodiment, the material of the third plate member 27 is a material having lower tensile strength than the material of the base members 23, 25, and the plate thickness of the third plate member 27 is set to be larger than the plate thickness of the base members 23, 25. For example, the third plate member 27 has tensile strength of about 450 MPa and a plate thickness of about 4.0 mm. However, the tensile strength and the plate thickness are not limited to these values.

At the part at which outer edges of a vertical part 27a of the third plate member 27 and the inner edges of the cutout 23b are butted, and at the part at which outer edges of an upper horizontal part 27b of the third plate member 27 and the inner edges of the cutout 23b of the base member 23 are butted, these edges are butted such that the outer surface of the base member 23 and an outer surface of the third plate member 27 become flush. In other words, these edges are butted such that an inner surface of the third plate member 27 protrudes toward the inner side relative to the inner surface of the base member 23 (protrudes in an amount corresponding to the difference in plate thickness therebetween).

Thus, the side rail 2 has the laser-welded joints that are joint portions at which the base members 23, 25 forming a main part of the side rail 2, and the plate members 26, 27 that are different in both plate thickness and material from the base members 23, 25 and fitted in the cutouts 25a, 23b formed at portions of the base members 23, 25 are joined together by laser welding.

As has been described above, in this embodiment, the front end portion of the kick part 2C is composed of the four panel members that are the base members 23, 25, the first plate member 24, and the second plate member 26, while the rear end portion of the kick part 2C is composed of the three panel members that are the base members 23, 25 and the third plate member 27. For the second plate member 26 and the third plate member 27, members that are different in both plate thickness and material (tensile strength) from the base members 23, 25 are adopted. Thus, it is possible to realize the side rail 2 that can achieve required load absorption performance and vehicle body strength, without joining a reinforcing member to the inner surface of the side rail 2 by arc welding, by appropriately selecting the plate thickness and the material of the plate members 26, 27. For example, the material of the plate members 26, 27 can be selected so as to define a pre-specified portion as the location of bending (buckling deformation) under a collision load in a frontal collision of the vehicle. The plate thickness of the plate members 26, 27 can be selected so as to adjust the stress acting on the plate members 26, 27.

For example, when a collision load acts on the kick part 2C in a frontal collision of the vehicle, bending (buckling deformation) of the front end portion of the kick part 2C and that of the rear end portion of the kick part 2C can be oriented in opposite directions from each other. Specifically, in the case of this embodiment, the front end portion of the kick part 2C deforms in a direction in which the outer rail member 22 (the side on which the plate member 26 is used) is compressed, while the rear end portion of the kick part 2C deforms in a direction in which the inner rail member 21 (the side on which the third plate member 27 is used) is compressed, and thereby effective load absorption performance is delivered. Thus, it is possible to realize the side rail 2 that can achieve the required load absorption performance and vehicle body strength without causing a significant increase in weight of the vehicle body by eliminating the need to adopt a structure in which a reinforcing member is joined to the inner surface of the side rail 2 by arc welding.

In the related art, it is necessary to select the tensile strength of the base member according to target proof strength of the side rail such that a collision load can be absorbed by deformation of the side rail when the side rail is subjected to the load. In this case, the tensile strength of the entire side rail can become low, and it is difficult to achieve high load absorption performance based on deformation of a pre-specified portion. According to the configuration of the embodiment, it is possible to deform a pre-specified portion by appropriately selecting the plate thickness and the material of the plate members 26, 27, and to thereby achieve the required load absorption performance.

Figure 12:
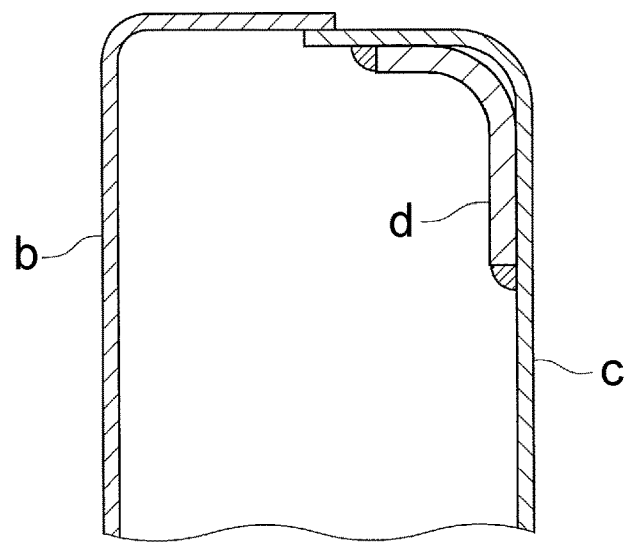
FIG. 12 is a view showing a section structure of a side rail in the related art.

Since a clearance is left between the panel members in the structure of the related art shown in FIG. 12, when a rust-proof paint is applied to the side rail 2, the paint does not easily penetrate into the clearance, making it difficult to produce a high rust-proof effect. Moreover, arc welding causes scattering of spatter around a welded area and generation of oxidized scale due to heat influence, which also makes it difficult to apply the paint and produce a high rust-proof effect. According to the configuration of the embodiment, no clearance is left between the panel members, and scattering of spatter and generation of oxidized scale can be reduced by adopting laser welding. Thus, a rust-proof paint is appropriately applied and a high rust-proof effect can be produced by the paint.

In the following, examples of experiments conducted to confirm the effects of the side rail 2 according to the above embodiment will be described.

Experimental Example 1

First, Experimental Example 1 will be described. In this experimental example, a stress acting on the kick part 2C in a frontal collision of the vehicle was measured. In this experimental example, two types of side rails 2 that were different from each other in length of the second plate member 26 forming a portion of the kick part 2C (length in a direction along a longitudinal direction of the side rail 2) were subjected to the same collision load (such a collision load as not to cause buckling deformation of the second plate member 26), and a stress thereby exerted on the kick part 2C was measured.

Figure 6:
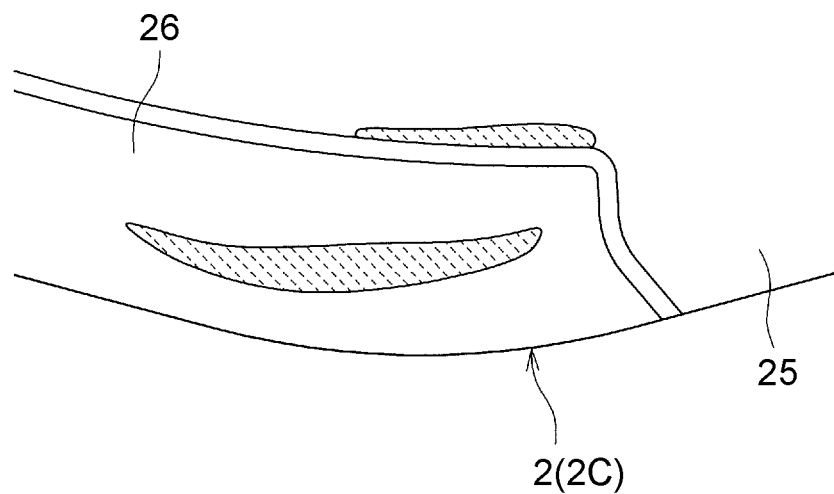
FIG. 6 is a view showing a stress distribution in the side rail as a result of a first experiment on the strength of the vehicle body frame according to the embodiment.
Figure 7:
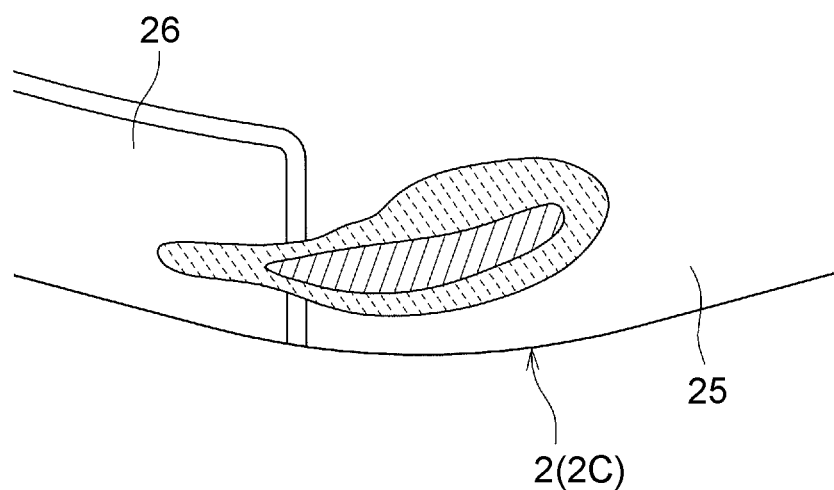
FIG. 7 is a view showing a stress distribution in the side rail as a result of a second experiment on the strength of the vehicle body frame according to the embodiment.

FIG. 6 is an enlarged view of the region circled by the long dashed short dashed line D in FIG. 3, and is a view showing a stress distribution in the side rail 2 (particularly the second plate member 26) as a result of a first strength experiment in which the length of the second plate member 26 was set to be comparatively long. FIG. 7 is a view showing a stress distribution in the side rail 2 (particularly the second plate member 26) as a result of a second strength experiment in which the length of the second plate member 26 was set to be comparatively short (set to be shorter than in the side rail 2 used in the first strength experiment). The regions shaded with dashed lines in FIG. 6 and FIG. 7 represent regions with a comparatively low stress. The region shaded with solid lines in FIG. 7 represents a region with a comparatively high stress (a region on which a higher stress acted than on the regions shaded with dashed lines). The regions in FIG. 6 and FIG. 7 that are not shaded represent regions on which almost no stress acted.

As shown in FIG. 6 and FIG. 7, in both cases, the regions in the side rail 2 in which the stress acted are comparatively small. However, in the side rail 2 in which the length of the second plate member 26 was set to be longer (the side rail 2 shown in FIG. 6), the regions on which the stress acted are smaller and this stress is lower than in the side rail 2 in which the length of the second plate member 26 was set to be shorter (the side rail 2 shown in FIG. 7). This result of the experiments has confirmed that, in the structure of the embodiment, setting the length of the second plate member 26 to be longer is effective in enhancing the vehicle body strength.

Experimental Example 2

Next, Experimental Example 2 will be described. In this experimental example, a plate thickness ratio required to reduce a stress acting on the side rail 2 in a frontal collision of the vehicle by a predetermined amount was compared between the structure of the embodiment and a structure of the related art.

Figure 8:
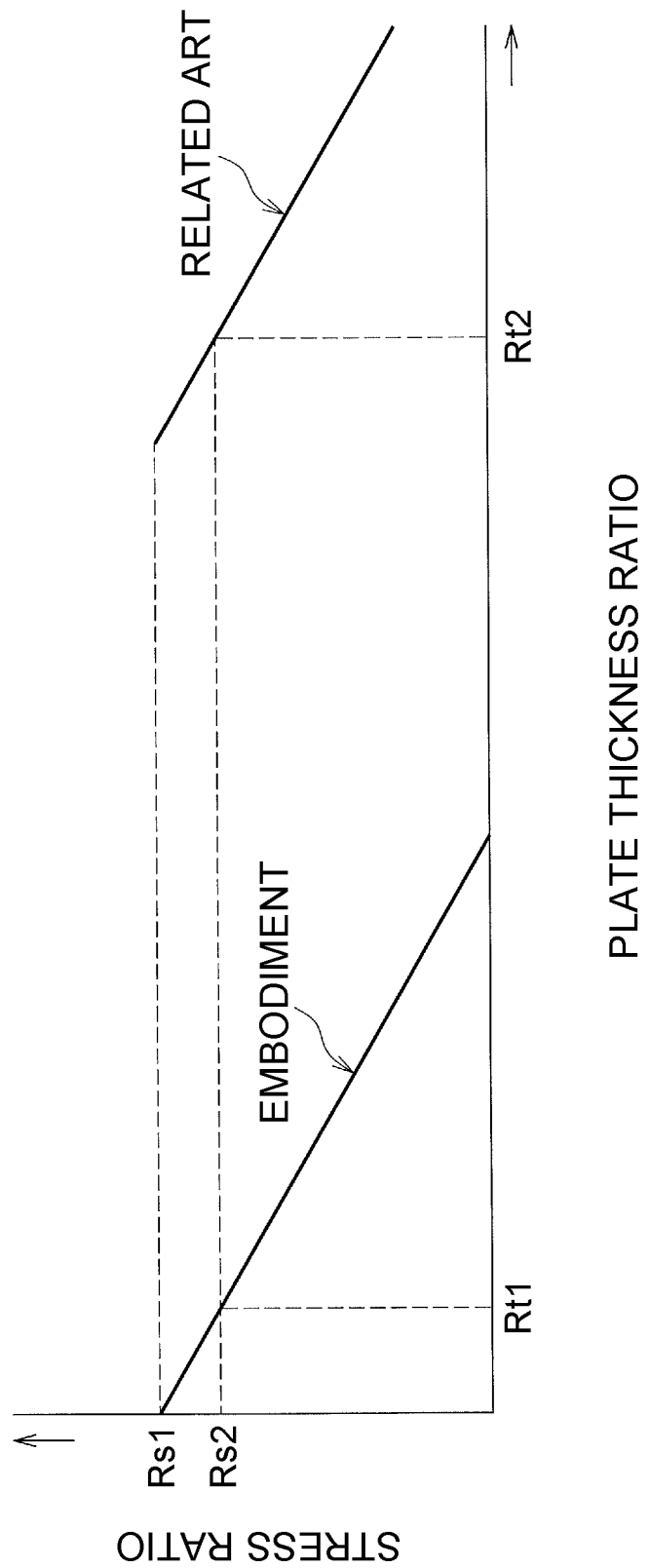
FIG. 8 is a view showing a result of measurement of a relationship between a stress ratio and a plate thickness ratio in each of the side rail according to the embodiment and a side rail according to the related art.

FIG. 8 is a view showing a result of measurement of a relationship between a stress ratio and a plate thickness ratio in each of the side rail 2 according to the embodiment and a side rail according to the related art. Here, the plate thickness ratio in the side rail 2 according to the embodiment refers to the ratio of the plate thickness of the plate member relative to the plate thickness of the base member. The plate thickness ratio in the side rail according to the related art refers to the ratio of the sum of the plate thickness of a base member and the plate thickness of a reinforcing member (a reinforcing member arc-welded to an inner surface of the base member) relative to the plate thickness of the base member.

As shown in FIG. 8, in the related art, the plate thickness ratio required to reduce the stress ratio by a predetermined amount (reduce the stress ratio from Rs1 to Rs2 in FIG. 8) is Rt2 that is a comparatively large value. In the embodiment, the plate thickness ratio is Rt1, which is a significantly smaller value than in the related art. Thus, it has been confirmed that the embodiment requires a smaller plate thickness of the panel member to reduce the stress ratio by a predetermined amount, and that a significant reduction in weight of the vehicle body (a weight reduction of about 40%) is thereby achieved.

Experimental Example 3

Next, Experimental Example 3 will be described. In this experimental example, a collision test was conducted on a vehicle having the vehicle body frame 1 according to the embodiment to check a deformation state of the side rail 2.

Figure 9:
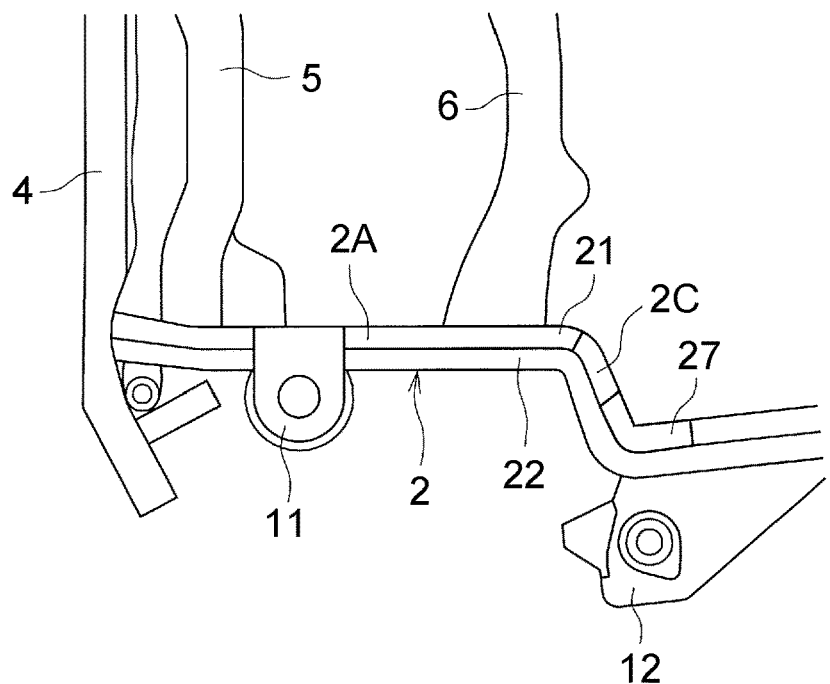
FIG. 9 is a view, corresponding to FIG. 2, showing a state of the vehicle body frame deformed in a frontal collision of a vehicle.

FIG. 9 is a plan view (corresponding to FIG. 2) showing a state of the vehicle body frame 1 deformed in the collision test of the vehicle. As shown in FIG. 9, in the vehicle body frame 1 of the embodiment, the front end portion of the kick part 2C and the rear end portion of the kick part 2C are bent (undergo buckling deformation) in opposite directions from each other. Thus, it has been confirmed that the front-end portion of the kick part 2C deforms in the direction in which the outer rail member 22 is compressed, while the rear end portion of the kick part 2C deforms in the direction in which the inner rail member 21 is compressed, and that thereby effective load absorption performance is delivered.

Experimental Example 4

Next, Experimental Example 4 will be described. This experimental example is to confirm a rust-proof effect of the structure of the embodiment. To produce a high rust-proof effect, a paint need be applied over the entire surface when the paint is applied around a welded area. As described above, when a clearance is left between the panel members, the paint does not easily penetrate into this clearance, making it difficult to produce a high rust-proof effect. Also when spatter is scattered around the welded area or oxidized scale due to heat influence spreads over a large area, it is difficult to apply a paint and produce a high rust-proof effect.

Figure 10:
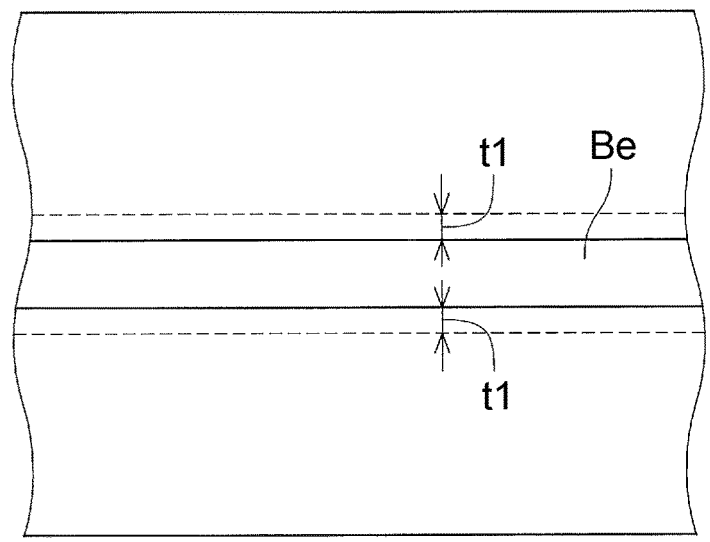
FIG. 10 is an enlarged view of a laser-welded portion of the side rail according to the embodiment.
Figure 11:
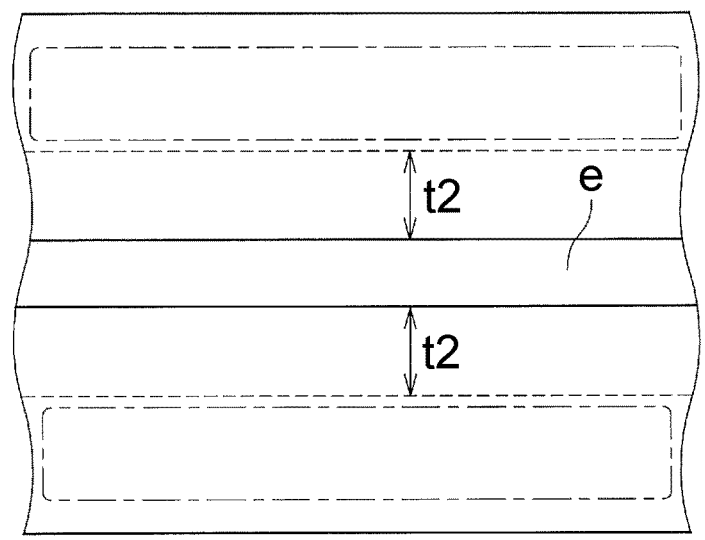
FIG. 11 is an enlarged view of an arc-welded portion of the side rail according to the related art.

FIG. 10 is an enlarged view of the laser-welded portion (around a bead Be) of the side rail 2 according to the embodiment. FIG. 11 is an enlarged view of an arc-welded portion (around a bead e) of a side rail a in a case where arc welding is performed instead of the laser welding.

In the arc-welded portion of the side rail a, the areas indicated by the dimensions t2 in FIG. 11 are areas of oxidized scale, and a large amount of spatter was scattered in the areas enclosed by the long dashed short dashed lines in FIG. 11.

In the laser-welded portion of the side rail 2 according to the embodiment, the areas indicated by the dimensions t1 in FIG. 10 are areas of oxidized scale, which are significantly smaller than those in FIG. 11. Moreover, almost no spatter was scattered around this laser-welded portion.

These results have confirmed that a paint can be applied over the entire surface of the laser-welded portion of the side rail 2 according to the embodiment, and that thereby a high rust-proof effect can be produced. Moreover, since the structure of the embodiment does not include a reinforcing member arc-welded to the base member, no clearance is left between the base member and the reinforcing member and thus the part into which the paint does not easily penetrate is reduced.

In addition, a result of a composite cycle corrosion test (CCT) called a composite environmental corrosion promotion test has confirmed that a maximum amount of corrosion in the side rail 2 according to the embodiment is about half that in the side rail according to the related art.

Other Embodiments

The present disclosure is not limited to the above embodiment, and any modification and application are possible within the scope of claims and a scope equivalent to the scope of claims.

For example, in the embodiment, the front end portion of the kick part 2C is composed of the four panel members 23, 24, 25, 26, while the rear end portion of the kick part 2C is composed of the three panel members 23, 25, 27. However, in the present disclosure, the number of the panel members composing each part is not particularly limited but can be arbitrarily set as a number required to achieve the required load absorption performance and vehicle body strength.

In the embodiment, the plate members 24, 26, 27 are fitted into the cutouts 23a, 25a, 23b formed in the base members 23, 25 and joined to the base members 23, 25 by laser welding. However, the present disclosure is not limited to this example. Openings may instead be formed in the base members 23, 25, and plate members having shapes matching the shapes of the openings may be fitted into the openings and joined to the base members 23, 25 by laser welding.

In the embodiment, no reinforcing member is joined to the inner surface of the side rail 2. However, the present disclosure is not limited to this example, and the configuration of the disclosure may be combined with a configuration in which a reinforcing member is joined. Also in this case, a significant increase in weight of the vehicle body can be avoided, since the configuration of the present disclosure can achieve the required load absorption performance and vehicle body strength while adopting a member having a small mass as the reinforcing member.

The present disclosure is applicable to a pair of left and right side rails that extends along a vehicle body length direction in a ladder frame.

What is claimed is:

1. A side rail comprising:
   base members forming a main part of the side rail that extends along a vehicle body length direction and has a closed-section structure; and
   plate members that are different in plate thickness and material from the base members, the plate members being fitted in a cutout or an opening formed at a portion of the base members, wherein
   the plate members have a laser-welded joint that is a joint portion at which the plate members are joined to the base members by laser welding.

2. The side rail according to claim 1, wherein the plate members are made of a material having tensile strength lower than tensile strength of the base members, and the plate members deform under a collision load in a frontal collision of a vehicle.

3. The side rail according to claim 1, wherein:
   the side rail includes an inner rail member forming an inner part in a vehicle width direction and an outer rail member forming an outer part in the vehicle width direction, and the inner rail member and the outer rail member are integrally welded together to form the closed-section structure; and
   the side rail includes a curved part shaped so as to curve toward an outer side in the vehicle width direction as the curved part extends toward a vehicle body rear side, and the outer rail member at a front end portion of the curved part and the inner rail member at a rear end portion of the curved part are respectively formed by fitting the plate members made of a material having tensile strength lower than tensile strength of the base members into the cutout or the opening formed at a portion of the base members, and joining the plate members to the base members by laser welding.

4. A manufacturing method of a side rail, the manufacturing method comprising:
   forming a cutout or an opening at a portion of base members forming a main part of the side rail;
   fitting plate members that are different in both plate thickness and material from the base members into the cutout or the opening;
   joining the plate members having been fitted into the cutout or the opening to the base members by laser welding;
   bending the base members to which the plate members have been joined, along with the plate members; and
   integrally joining together a first rail member and a second rail member that are formed by the base members and plate members such that a closed-section structure is formed by the first rail member and the second rail member.

* * * * *